(12) United States Patent
Boyd et al.

(10) Patent No.: US 8,425,348 B2
(45) Date of Patent: Apr. 23, 2013

(54) GOLF CLUB WITH ADJUSTABLE WEIGHT

(75) Inventors: Robert Boyd, Euless, TX (US); John T. Stites, Weatherford, TX (US); Gary G. Tavares, Southbridge, MA (US)

(73) Assignee: Nike, Inc., Beaverton, OR (US)

( * ) Notice: Subject to any disclaimer, the term of this patent is extended or adjusted under 35 U.S.C. 154(b) by 196 days.

(21) Appl. No.: 12/894,390

(22) Filed: Sep. 30, 2010

(65) Prior Publication Data
US 2012/0083360 A1    Apr. 5, 2012

(51) Int. Cl.
*A63B 53/06*    (2006.01)

(52) U.S. Cl.
USPC .......................................................... 473/335

(58) Field of Classification Search .......... 473/334–339, 473/345–346
See application file for complete search history.

(56) References Cited

U.S. PATENT DOCUMENTS

| | | | | |
|---|---|---|---|---|
| 1,133,129 A * | 3/1915 | Govan | ........................... | 473/337 |
| 3,979,122 A * | 9/1976 | Belmont | ....................... | 473/336 |
| 3,979,123 A * | 9/1976 | Belmont | ....................... | 473/337 |
| 4,607,846 A * | 8/1986 | Perkins | .......................... | 473/336 |
| 4,869,507 A * | 9/1989 | Sahm | ............................ | 473/337 |
| 5,916,042 A * | 6/1999 | Reimers | ........................ | 473/334 |
| 6,277,032 B1 * | 8/2001 | Smith | ........................... | 473/336 |
| 7,153,220 B2 * | 12/2006 | Lo | ................................. | 473/335 |
| 7,611,424 B2 * | 11/2009 | Nagai et al. | .................. | 473/334 |
| 2006/0178228 A1 | 8/2006 | DiMarco | | |
| 2008/0261715 A1 * | 10/2008 | Carter | .......................... | 473/291 |
| 2009/0118034 A1 * | 5/2009 | Yokota | ......................... | 473/338 |
| 2009/0186717 A1 * | 7/2009 | Stites et al. | .................. | 473/291 |
| 2011/0275454 A1 * | 11/2011 | Stites et al. | .................. | 473/334 |

OTHER PUBLICATIONS

PCT/US2011/051758, International Search Report and Written Opinion, mailed Dec. 22, 2011.

* cited by examiner

*Primary Examiner* — Stephen L. Blau
(74) *Attorney, Agent, or Firm* — Banner & Witcoff, Ltd.

(57) ABSTRACT

A golf club with a golf club head having one or more adjustable weights is presented. The club head may include a club head body having a recessed formed therein. In some arrangements, the recess may be formed in a sole portion of the club head body. The golf club head further includes an adjustable weight that may be rotated from a first position to a second position to adjust the weight characteristics, and thus the performance characteristics of the golf club. In some arrangements, the adjustable weight and/or any hardware, fasteners, etc. associated with the adjustable weight may be constantly connected to the golf club head such that adjustment of the weight does not include removal of the weight and/or any hardware, fasteners, etc.

11 Claims, 18 Drawing Sheets

GOLF CLUB WITH ADJUSTABLE WEIGHT

FIELD OF THE INVENTION

This invention relates generally to golf clubs. In particular, the invention relates to golf clubs and golf club head structures having a movable, adjustable weight that may be transferred between various positions.

BACKGROUND

As the popularity of the game of golf has increased in recent decades, golf club designers have continued to develop new ways to improve performance of clubs, reduce weight associated with clubs, etc. In addition, club designers are often looking for new ways to redistribute weight associated with a golf club and/or golf club head. For instance, club designers are often looking to distribute weight to provide more forgiveness in a club head, improved accuracy, and the like. Accordingly, it would be advantageous to provide a golf club head having a movable or adjustable weight to permit a user to distribute weight to various regions of the club head as desired.

SUMMARY

The following presents a general summary of aspects of the invention in order to provide a basic understanding of the invention and various features associated with the invention. This summary is not intended to limit the scope of the invention in any way, but it simply provides a general overview and context for the more detailed description that follows.

Aspects of this invention relate to golf clubs and golf club head structures having movable and/or adjustable weights that may be adjusted by an end user to alter the flight path of a ball. In some arrangements, a club head may include one or more adjustable weights that are movable from a first position to a second position, and vice versa, to alter the flight path of a ball. The first position may, in some arrangements be proximal a front portion of the golf club head while the second position may, in some arrangements, be proximal the rear portion of the golf club head. In some examples, the movable and/or adjustable weight, as well as any hardware, fasteners, etc. associated with the adjustable weight, may remain connected to the club head in the first position, second position and any intermediate positions. That is, the weight and associated hardware may, in some arrangements, not be removable from the golf club head but rather may be adjustable.

BRIEF DESCRIPTION OF THE DRAWINGS

A more complete understanding of the present invention and certain advantages thereof may be acquired by referring to the following detailed description in consideration with the accompanying drawings, in which.

Figure 1A:
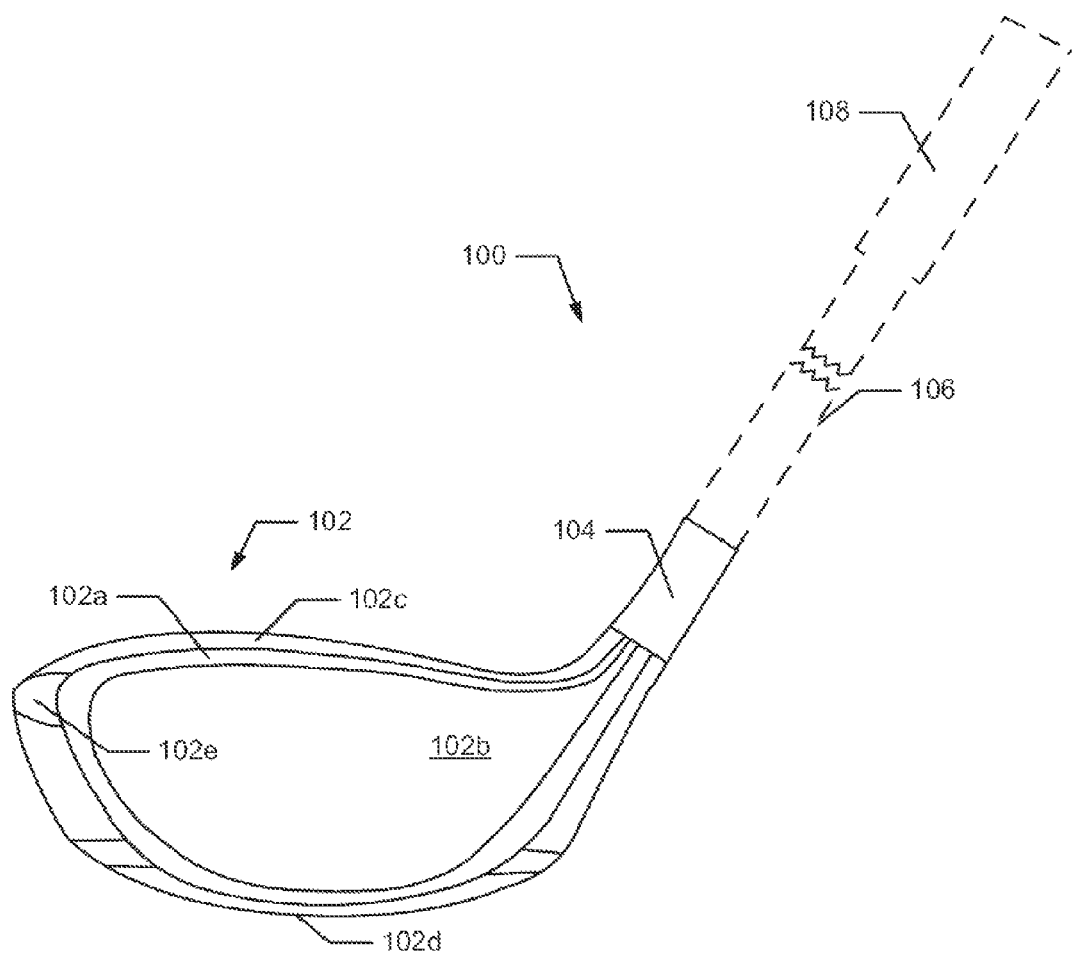
FIG. 1A is an example golf club that may be used in accordance with illustrative aspects of the invention.

The reader is advised that the attached drawings are not necessarily drawn to scale.

DETAILED DESCRIPTION

In the following description of various example structures in accordance with the invention, reference is made to the accompanying drawings, which form a part hereof, and in which are shown by way of illustration various example articles, including one or more golf club or golf club head structures. Additionally, it is to be understood that other specific arrangements of parts and structures may be utilized and structural and functional modifications may be made without departing from the scope of the present invention. Also, while the terms "top," "bottom," "front," "back," "rear," "side," "underside," "overhead," and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention. Further, the invention generally will be described as it relates to wood-type golf clubs. However, aspects of the invention may be used with any of several types of golf clubs, including hybrid type golf clubs, utility clubs, and the like and nothing in the specification or figures should be construed to limit the invention to use with the wood-type golf clubs described.

A. General Description of an Illustrative Golf Club with Golf Club Head Having a Movable and/or Adjustable Weight In general, as described above, aspects of this invention relate to a golf club or golf club head structure. More detailed descriptions of aspects of this invention follow.

1. Example Golf Clubs and Golf Club Heads Having Movable and/or Adjustable Weights Aspects of this invention relate to golf club and golf club head structures. In at least some examples, the golf club head includes a club head body including at least a front, a rear, a heel, a toe, a sole, a top and a ball striking surface. The club head body may define an interior cavity of the golf club head. In some arrangements, a recess may be formed in the sole of the golf club head. The golf club head may further include an adjustable weight, the adjustable weight being received in the recess formed in the sole of the golf club. In some examples, the adjustable weight may be movably connected to the golf club head. For instance, the adjustable weight may be movable from a first position proximal the front portion of the club head body to a second position proximal the rear portion of the club head body. In some arrangements, the adjustable weight may be rotatable from the first position to the second position in a plane that is generally perpendicular to the ball striking surface of the club head body. In at least some examples, the adjustable weight and any hardware, fasteners, etc. associated with the weight may be constantly connected to the club head in the first position, second position and any intermediate positions.

In other arrangements, the golf club head may include a club head body having a recess formed therein, the club head body having a first end and a second end. The golf club head may further include an adjustable weight shaped to be received in at least a portion of the recess formed in the club head body. In some examples, the adjustable weight is rotatable from a first position proximal the first end of the club head body to a second position proximal the second end of the club head body. In some arrangements, the golf club head may further include a hinge around which the adjustable weight may be rotated.

In still other arrangements, the golf club head may include a club head body, the club head body including at least a front, a rear, a heel, a toe, a sole, a top and a ball striking surface. In some examples, the club head body may define an interior cavity of the golf club head. In some examples, a recess may be formed in the sole of the club head body. The golf club head may further include an adjustable weight configured to be received in the recess. In at least some examples, the adjustable weight may be rotatable about a pivot point. In some arrangements, the adjustable weight may have a first end having a first weight and a second end having a second weight, the first weight being different from the second weight. In at least some arrangements, the first end and the second end may be formed of different materials. In still other arrangements, the adjustable weight may be formed of a first material and one end of the adjustable weight may further include an embedded weight formed of a second material different from the first material.

In still other arrangements, the golf club head may include a club head body having a recess formed therein, the club head body may have a front and a rear. The golf club head may further include an adjustable weight shaped to be received in the recess of the club head body. In some arrangements, the adjustable weight may be adjustable from a first position, in which a first end of the adjustable weight is positioned proximal the front region of the club head body and a second end of the adjustable weight is positioned proximal the rear of the club head body, to a second position in which the first end of the adjustable weight is proximal the rear and the second end of the adjustable weight is proximal the front. In at least some examples, the first end of the adjustable weight includes a first end weight and the second end of the adjustable weight includes a second end weight. In some arrangements, the second end weight may be different from the first end weight.

Additional aspects and specific examples of the articles described above will be described in detail more fully below. The reader should understand that these specific examples are set forth merely to illustrate examples of the invention, and they should not be construed as limiting the invention.

B. Specific Examples of the Invention

Referring to the figures and following discussion, golf clubs and golf club heads in accordance with the present invention are described. As discussed above, the golf club and club head structures described herein may be described in terms of wood-type golf clubs. However, the present invention is not limited to the precise arrangements disclosed herein but applies to golf clubs generally, including hybrid clubs, iron-type golf clubs, utility-type golf clubs, and the like.

Example golf club and golf club head structures in accordance with this invention may relate to "wood-type" golf clubs and golf club heads, e.g., clubs and club heads typically used for drivers and fairway woods, as well as for "wood-type" utility or hybrid clubs, or the like. Although these club head structures may have little or no actual "wood" material, they still may be referred to conventionally in the art as "woods" (e.g., "metal woods," "fairway woods," etc.).

Golf club heads may generally include a plurality of different regions, segments, portions, ends, etc. In an example arrangements, a golf club head may generally include a front face, a rear, a toe, a heel, a crown and a sole that may generally define an interior of the golf club head. The golf club head may include a multiple piece construction and structure, e.g., including one or more of a sole, a front face (optionally including a ball striking surface integrally formed therein or attached thereto), a top or crown, a rear, etc. Of course, if desired, various portions of the club head structure may be integrally formed with one another, as a unitary, one piece construction, without departing from the invention (e.g., the front face and/or rear may be integrally formed with the sole and/or crown, etc.). Optionally, if desired, the various portions of the club head structure (such as the sole, the crown, the face, the rear, etc.) individually may be formed from multiple pieces of material without departing from this invention (e.g., a multi-piece crown, a multi-piece sole, etc.). Also, as other alternatives, if desired, the entire club head may be made as a single, one piece, unitary construction, or a front face may be attached to a one piece club head aft body (optionally, a hollow body, etc.). More specific examples and features of golf club heads and golf club structures according to this invention will be described in detail below in conjunction with the example golf club structures illustrated in FIGS. 1 through 4.

Figure 1B:
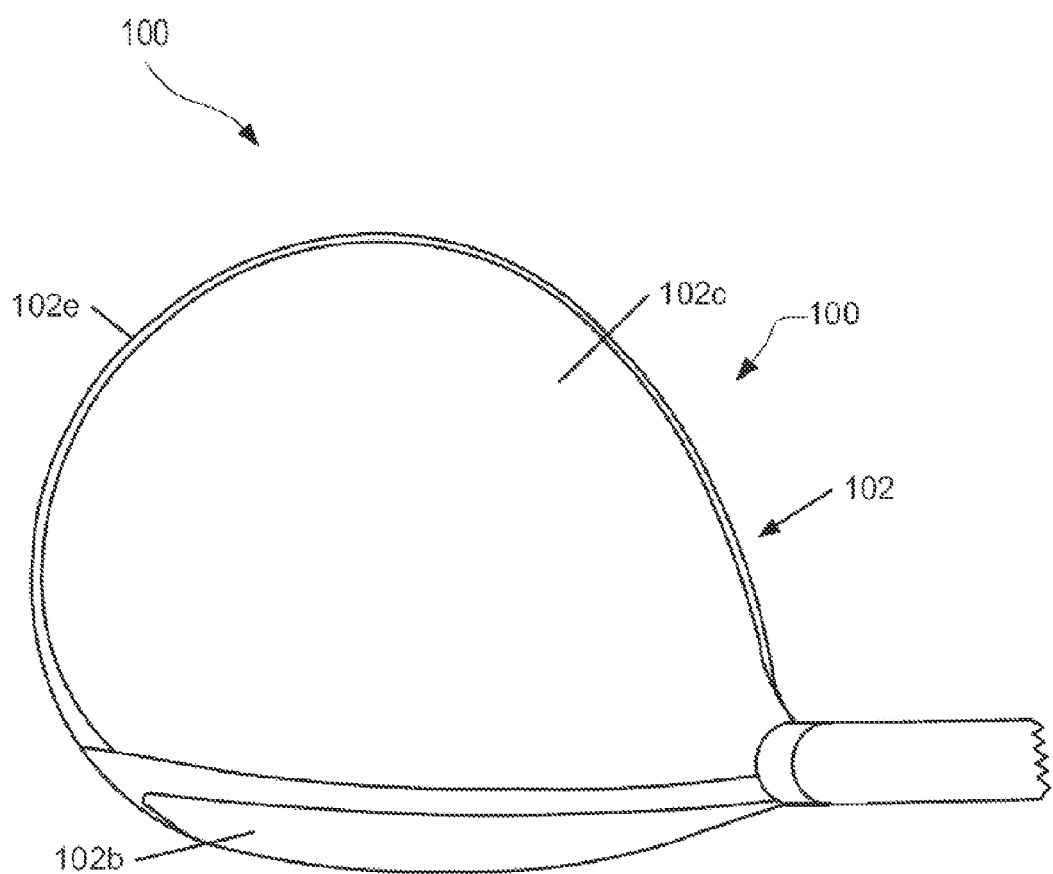
FIG. 1B is a top view of the example golf club of FIG. 1A in accordance with aspects of the invention.

FIGS. 1A and 1B generally illustrate a wood-type golf club 100 that may be used in accordance with one example of this invention. The golf club 100 includes a golf club head 102 having, in the arrangement shown, a multi-part construction and a hosel 104 at which the head 102 is connected to a shaft 106. The hosel 104 may be of any desired design and construction without departing from this invention (e.g., an exteriorly extending hosel 104, as shown; an internal hosel; a releasable hosel; etc.), including conventional designs and constructions as are known and used in the art. Likewise, the shaft 106 may be made of any desired materials and connected to the hosel 104 (or directly to the club head 102) in any desired manner, including conventional materials, connected in conventional manners, as are known and used in the art. As some more specific examples, if desired, the shaft 106 may be made from steel (including stainless steel), aluminum, or other metal or metal alloy materials; graphite based materials; composite or other non-metal materials; polymeric materials, combinations of various materials, etc. The shaft 106 may be connected to the hosel 104 and/or directly to the club head 102 via cements or adhesives, via mechanical connection systems, and the like. If desired, the shaft 106 may be connected to the hosel 104 or to the club head 102 by a releasable mechanical or adhesive connection that easily allows the club head 102 and shaft 106 to be separated from one another (and optionally thereafter engaged with a different head or shaft).

A grip 108 or other handle element may be provided on and/or integrally formed with the shaft 106. Any desired materials may be used for the grip 108, such as rubber based materials (synthetic or natural); polymer based materials (including cord or other fabric or textile containing polymers); leather materials (synthetic or natural); etc. The grip 108 or other handle element may be engaged with or formed as part of the shaft 106 in any desired manner without departing from this invention, including through the use of adhesives or cements, mechanical connectors (e.g., threaded connections), welding, soldering or the like. In some arrangements, the grip or handle 108 may be integrally formed as a unitary, one-piece construction with the shaft 106. In at least some example structures according to this invention, the grip 108 will be made of conventional materials as are known and used in the art, and it will be attached to the shaft 106 in conventional manners as are known and used in the art.

The club head 102 itself also may be constructed in any suitable or desired manner and/or from any suitable or desired materials without departing from this invention, including from conventional materials and/or in conventional manners known and used in the art. For example, in the example structure 102 shown in FIGS. 1A and 1B, the club head 102 includes a ball striking surface 102a (optionally including a ball striking face plate 102b integrally formed with the surface 102a or attached to club such that the face plate 102b and a frame together constitute the overall ball striking surface 102a). In some arrangements, the ball striking surface 102a and/or ball striking face plate 102b may be connected to the remainder of the club head using one or more mechanical fasteners. The club head 102 of this illustrated example further includes a crown 102c, a sole 102d, and at least one body portion 102e located between the crown or top 102c (e.g., material extending from the face member 102a, around the club head periphery from the heel end or edge to the toe end or edge). This body portion 102e, which extends to a location substantially opposite the striking face, may include a rear of the club head structure.

A wide variety of overall club head constructions are possible without departing from this invention. For example, if desired, some or all of the various individual parts of the club head 102 described above may be made from multiple pieces that are connected together (e.g., by welding, adhesives, or other fusing techniques; by mechanical connectors; etc.). The various parts (e.g., crown 102c, sole 102d, and/or body portion(s) 102e) may be made from any desired materials and combinations of different materials, including materials that are conventionally known and used in the art, such as metal materials, including lightweight metal materials. More specific examples of suitable lightweight metal materials include steel, titanium and titanium alloys, aluminum and aluminum alloys, magnesium and magnesium alloys, etc.

As additional examples or alternatives, in order to reduce the club head 102 weight, if desired, one or more portions of the club head structure 102 advantageously may be made from a composite material, such as from carbon fiber composite materials that are conventionally known and used in the art. Other suitable composite or other non-metal materials that may be used for one or more portions of the club head structure 102 include, for example: fiberglass composite materials, basalt fiber composite materials, polymer materials, etc. As some more specific examples, if desired, at least some portion(s) of the crown 102c may be made from composite or other non-metal materials. Additionally or alternatively, if desired, at least some portion(s) of the sole 102d may be made from composite or other non-metal materials. As still additional examples or alternatives, if desired, one or more portions of the club head's body member 102e (e.g., U-shaped or C-shaped ribbons of material that extend around the rear of the club head 102 and from the face component's 102b heel to the toe) may be made from composite or other non-metal materials. As yet further examples, if desired, the entire body portion of the club head aft of a club head face 102a (also called an "aft body"), or optionally the entire club head, may be made from composite or other non-metal materials without departing from this invention. The composite or other non-metal material(s) may be incorporated as part of the club head structure 102 in any desired manner, including in conventional manners that are known and used in the art. Reducing the club head's weight (e.g., through the use of composite or other non-metal materials, lightweight metals, metallic foam or other cellular structured materials, etc.) allows club designers and/or club fitters to selectively position additional weight in the overall club head structure 102, e.g., to desirable locations to increase the moment of inertia, affect the center of gravity location, and/or affect other playability characteristics of the club head structure 102 (e.g., to draw or fade bias a club head; to help get shots airborne by providing a low center of gravity; to help produce a lower, more boring ball flight; to help correct or compensate for swing flaws that produce undesired ball flights, such as hooks or slices, ballooning shots, etc.).

The various individual parts that make up a club head structure 102, if made from multiple pieces, may be engaged with one another and/or held together in any suitable or desired manner, including in conventional manners known and used in the art. For example, the various parts of the club head structure 102, such as the ball striking surface 102a, the ball striking plate 102b, the crown 102c, the sole 102d, and/or the body portion(s) 102e may be joined and/or fixed together (directly or indirectly through intermediate members) by adhesives, cements, welding, soldering, or other bonding or finishing techniques, and the like. In some arrangements, the various parts of the club head 102 may be joined by mechanical connectors (such as threads, screws, nuts, bolts, or other connectors), and the like. If desired, the mating edges of various parts of the club head structure 102 (e.g., the edges where members 102a, 102b, 102c, 102d, and/or 102e contact and join to one another) may include one or more raised ribs, tabs, ledges, or other engagement elements that fit into or onto corresponding grooves, slots, surfaces, ledges, openings, or other structures provided in or on the facing side edge to which it is joined. Cements, adhesives, mechanical connectors, finishing material, or the like may be used in combination with the raised rib/groove/ledge/edge or other connecting structures described above to further help secure the various parts of the club head structure 102 together.

The dimensions and/or other characteristics of a golf club head structure according to examples of this invention may vary significantly without departing from the invention. As some more specific examples, club heads in accordance with at least some examples of this invention may have dimensions and/or other characteristics that fall within the various example ranges of dimensions and/or characteristics of the club heads described in U.S. patent application Ser. No. 11/125,327 filed May 10, 2005 (and corresponding to U.S. Published Patent Appln. No. 2005-0239576 A1 published Oct. 27, 2005). Note, for example, the Tables in these documents. This U.S. patent publication is entirely incorporated herein by reference. In accordance with at least some example club head structures according to this invention, the ratio of the breadth dimension (i.e., overall dimension "B" in the front to back direction) to length dimension (i.e., overall dimension "L" from in the heel to toe direction) (i.e., ratio "B/L") will be at least 0.9, and in some examples, this ratio may be at least 0.92, at least 0.93, at least 0.94, at least 0.95, at least 0.96, at least 0.97, or even at least 0.98. The length dimension L may be at least 4 inches, and in some examples, at least 4.25 inches, at least 4.5 inches, at least 4.75 inches, or even at least 4.85 inches. The club head may have any desired volume, including, for example, a volume of at least 200 cc, and in some examples at least 350 cc, at least 400 cc, at least 420 cc, or even at least 450 cc.

Figure 2A:
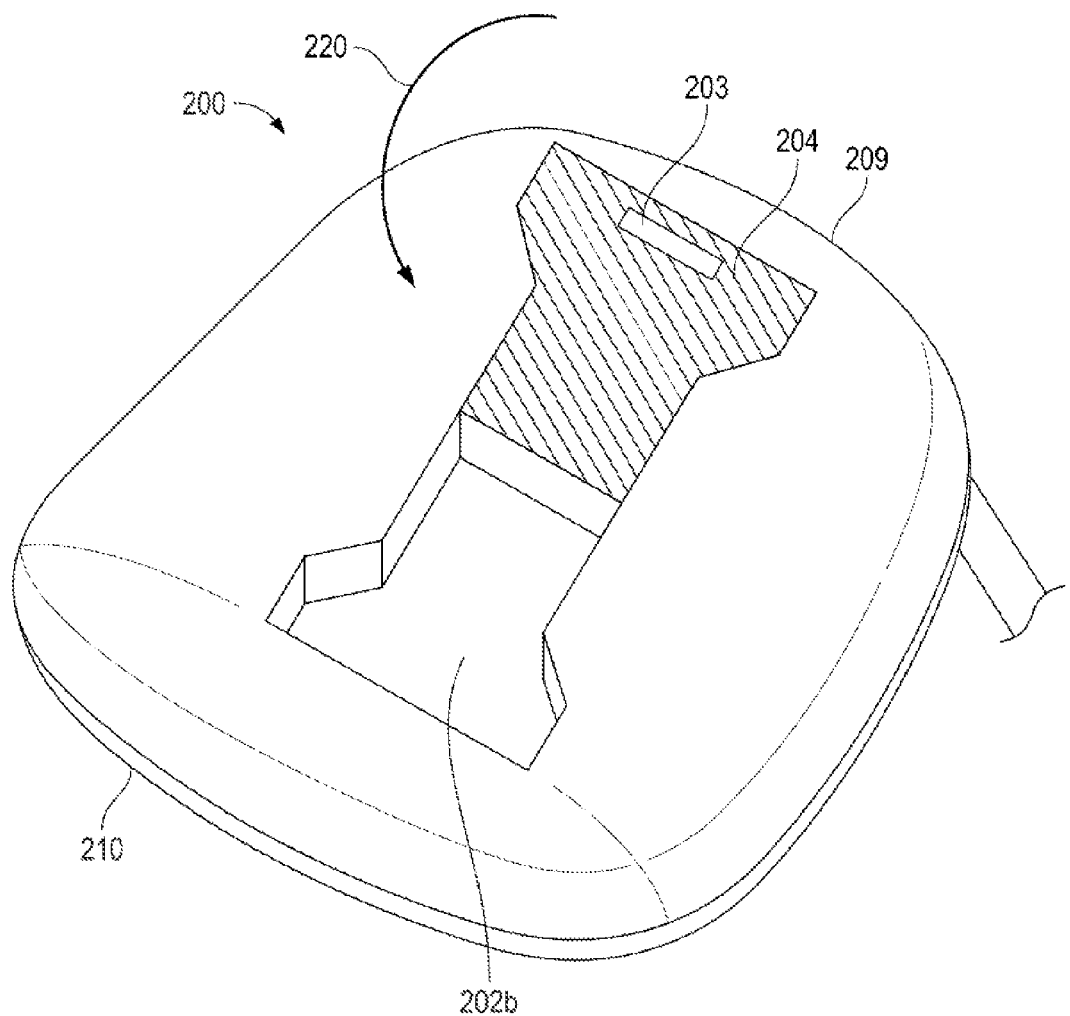
FIGS. 2A-2C illustrate one adjustable weight arrangement in accordance with illustrative aspects of the invention.
Figure 2B:
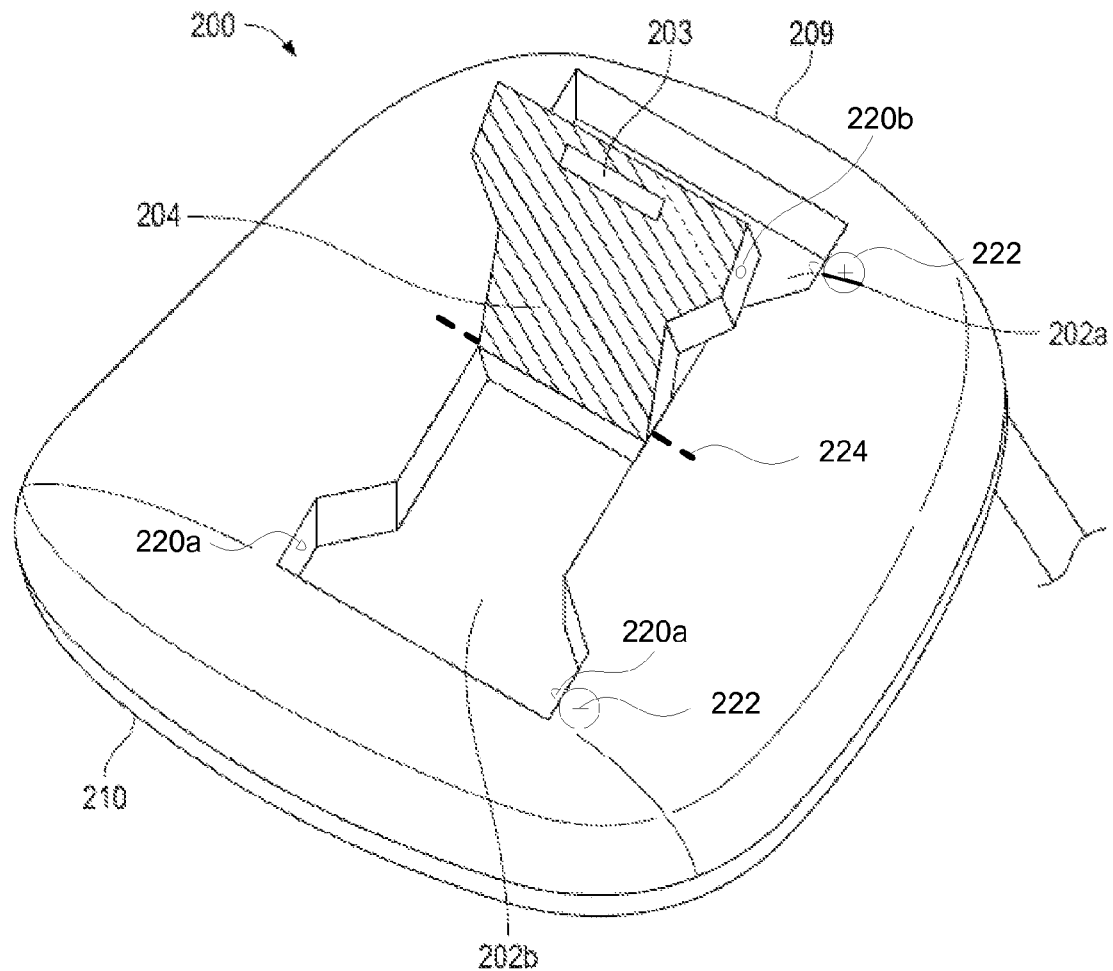
Figure 2C:
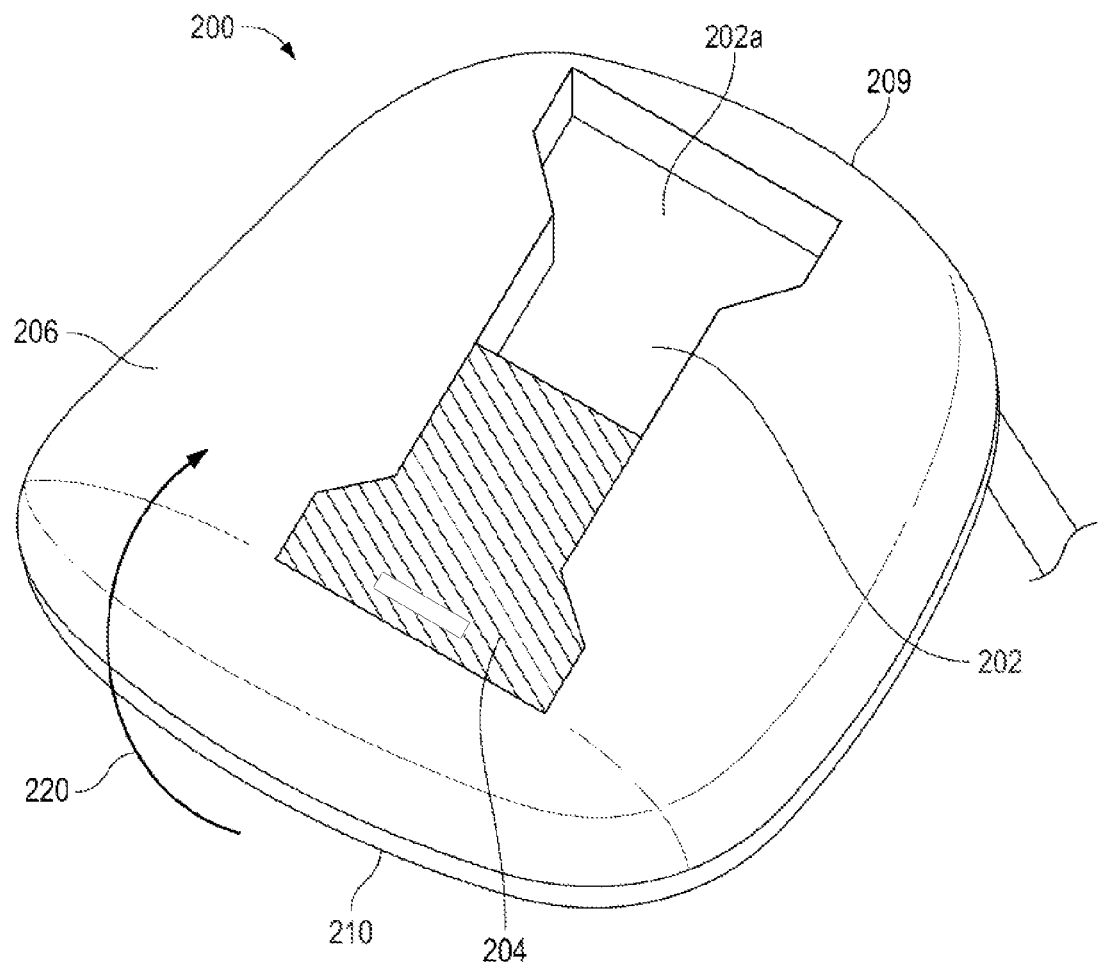

One example way to improve performance of the club, or accuracy, distance, etc. of a shot, is by redistributing the weight of the club head to one or more regions in order to lower or shift a center of gravity of the club. FIGS. 2A-2C illustrate one example arrangement of a golf club head having a movable and/or adjustable weight that may be adjusted by an end user to alter the performance characteristics of the golf club. The club head 200 shown in FIGS. 2A-2C includes a recess region 202 formed in a bottom surface or sole portion 206 of the golf club head 200. An adjustable weight 204 may be received into the recess 202 or a portion thereof The position of the adjustable weight 204 within the recess may alter the performance characteristics of the golf club head, as will be discussed more fully below.

The geometry of the moveable weight, or adjustable weight 204 may aid in distributing weight to desired areas or regions of the club head 200. For instance, the adjustable weight 204 shown may be somewhat T-shaped in order to aid in distributing weight to the outer corners of the club head 200. Also, the adjustable weight 204 may be symmetrical along an axis extending through a center of the club head from the front face of the golf club head to the rear edge of the golf club head. Although this somewhat T-shaped arrangement is shown, various other geometries may be used in accordance with this disclosure and nothing in the specification or figures should be viewed as limiting the adjustable weight 204 to the geometry shown. For instance, in some examples, the movable and/or adjustable weight 204 may be plus (+) shaped with the various ends of the plus having one or more different weight values such that the movable and/or adjustable weight may be flipped (or, in some arrangements, rotated, as will be discussed more fully below) to adjust the weight characteristics of the golf club head. Although a substantially square shaped club head 200 is shown, the adjustable weight arrangements described herein may be used with club heads having more rounded, oblong, etc. shapes and nothing in the description or figures should be viewed as limiting the adjustable weight arrangements to use with substantially square head golf clubs.

The weight 204 shown in FIGS. 2A-2C may be moveable and/or adjustable within the recess 202 in the club head 200. In some arrangements, the moveable and adjustable weight 204 may be permanently connected to the club head 200, while remaining moveable or adjustable relative to the club head 200. That is, although the weight 204 may be moved, adjusted, rotated, etc., the adjustable weight 204 may retain connected to the club head 200 or in contact with the club head 200 from a first position (such as shown in FIG. 2A) to a second position (such as shown in FIG. 2C) and through various intermediate positions (such as shown in FIG. 2B). Additionally or alternatively, any fixtures, hardware, etc. that may be used to connect the adjustable weight 204 to the club head 200, such as connector 203, may also be permanently connected to the club head 200. That is, while any hardware may be moveable, adjustable (i.e., able to be tightened or loosened), etc. it may remain connected to or in contact with the club head 200 in all or substantially all positions. Some examples of hardware that may be used as connector 203 to connect the adjustable, movable weight 204 to the golf club head 200 may include lock nuts, set screws, hook and loop type fasteners (such as VELCRO), double sided tape or other adhesives, and the like. This permanent connection of the adjustable weight 204 and/or hardware may reduce a risk of the adjustable weight or hardware being thrown from the club during use. Further, the permanent connection may aid in ease of adjusting the weight 204 because all parts remain connected to the club head 200, thereby reducing a risk of loss of parts.

FIG. 2A illustrates one arrangement of a golf club head 200 with movable and adjustable weight 204 in a first position. As shown, one or more weights 204 are contained within a recess 202 formed in a bottom surface or sole 206 of the club head 200. The size, shape and configuration of the weight 204 may vary based on the type of club, skill level of the golfer, number of weights used, and the like. In order to redistribute a portion of the weight associated with the club head 200 to a rear 210 of the club head 200, the adjustable weight 204 may be pulled upward, away from the surface of the club head (i.e., along arrow 220), rotated toward the rear 210 of the club head 200 and pressed into a corresponding rear portion 202b of the recess 202, as shown in FIGS. 2A-2C. Although FIGS. 2A-2C illustrate a single weight 204 rotating from the forward portion 202a of the recess 202 to the rear portion 202b of the recess 202, a plurality of weights 204 may also be used.

Figure 5A:
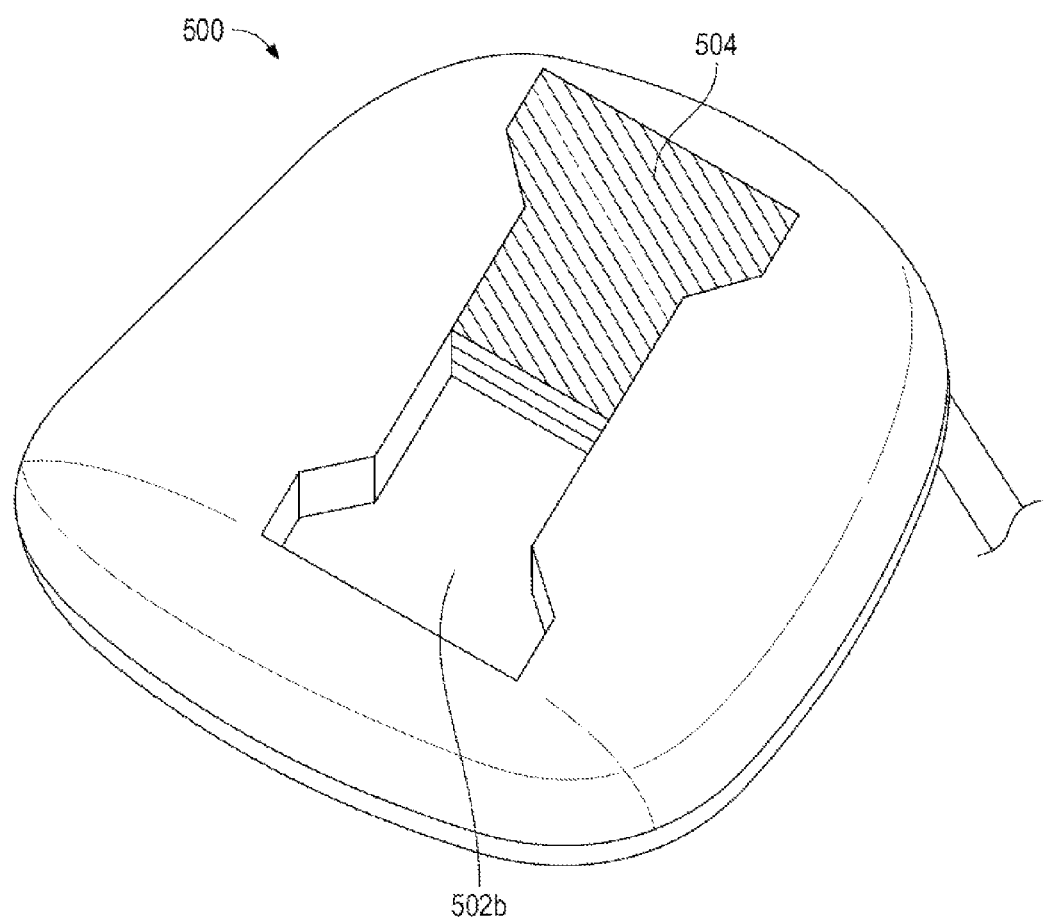
FIGS. 5A-5C illustrate another example moveable and/or adjustable weight arrangements in accordance with at least some illustrative aspects of the invention.
Figure 5B:
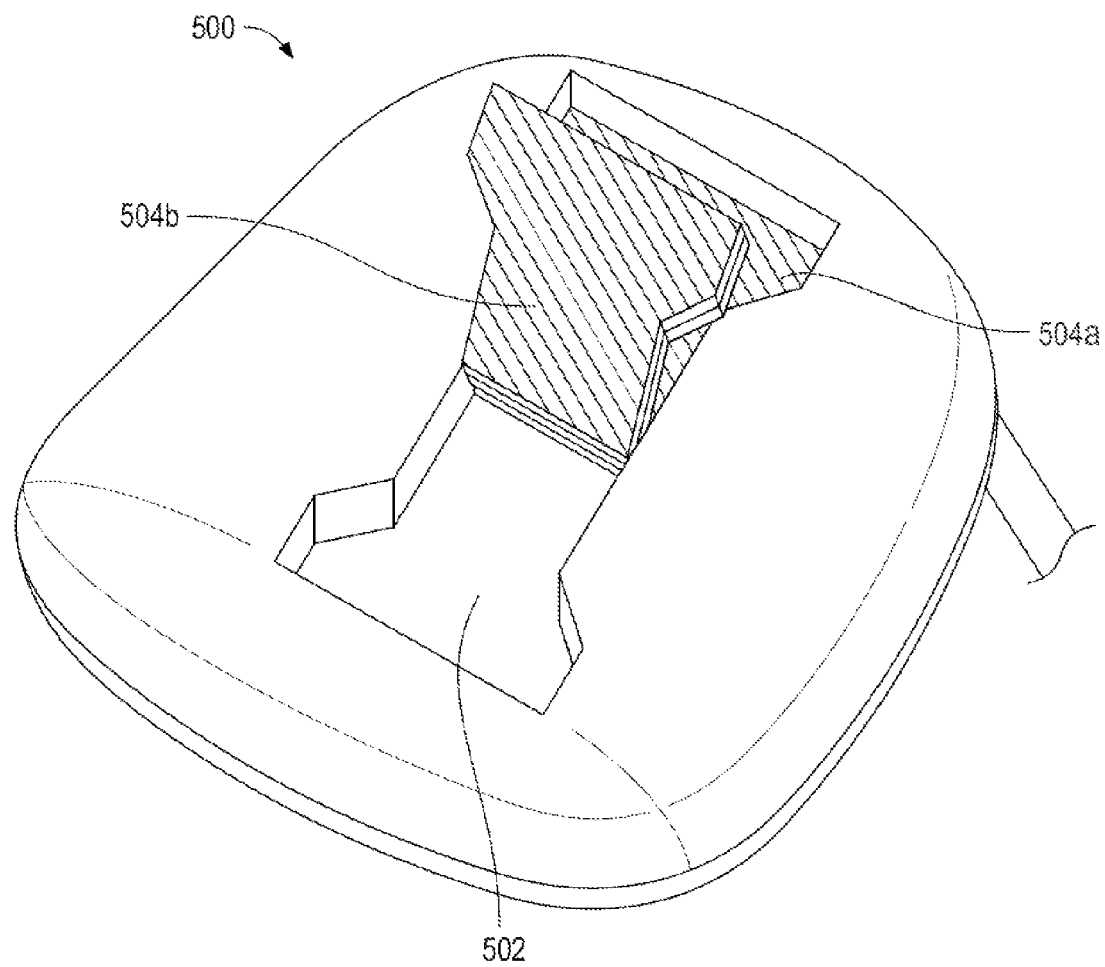
Figure 5C:
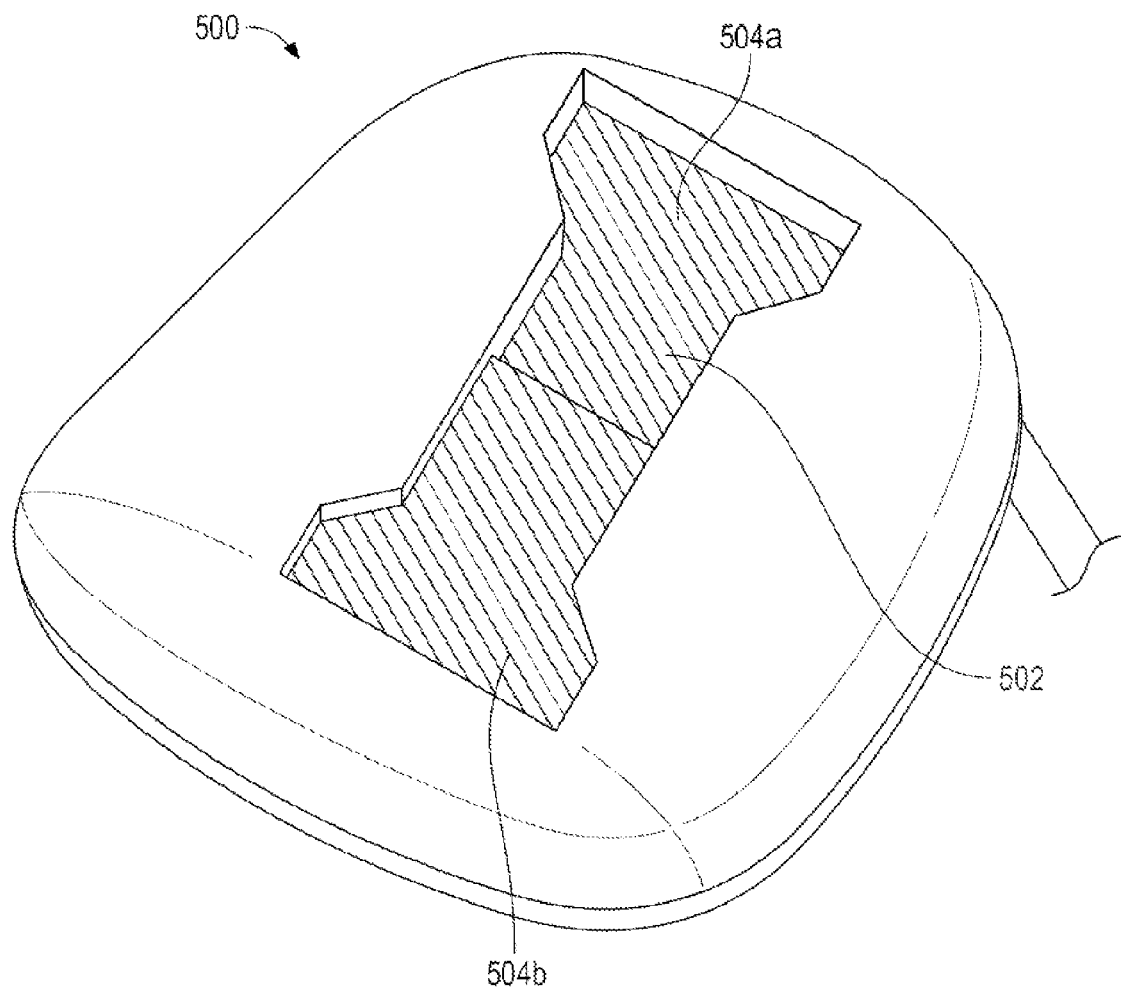

For instance, FIGS. 5A-5C illustrate one arrangement in which a plurality of weights 504 may be adjustable and/or movable relative to each other and the golf club head 500 to adjust the weight characteristics of the golf club head 500. For instance, in FIG. 5A, a plurality of weights 504 may be stacked in a portion of the recess 502. In some examples, one or more weights may be moved to the opposite portion of the recess 502 to adjust the weight characteristics of the golf club head 500. For example, FIG. 5B illustrates two weight members, labeled 504b being rotated to the opposite portion of the recess 502. Additional movable weight member 504a, as illustrated, may remain in the initial portion of the recess 502. FIG. 5C illustrates the multiple weight members 504b in the front portion of the recess 502, while 504a remains in the rear. As desired, the weight member 504b may be moved back to the rear portion of the recess 502 or one weight member of 504b may be rotated to the rear portion of the recess 502, etc. This may permit further adjustment of the weight of the golf club head 500. In some examples, each weight member may have the same or similar weight values or characteristics. In other examples, the weight characteristics may vary. Although three weight members are shown, more of fewer movable weight members may be provided to provide further adjustment of weight distribution.

FIG. 2B illustrates one intermediate position of the adjustable weight 204. That is, the adjustable weight 204 has been pulled upward and rotated out of the forward portion 202a of the recess 202 and toward the rear portion 202b of the recess 202. Although the recess 202 is shown as a continuous cavity including both a front portion 202a and a rear portion 202b, in some arrangements, the front portion 202a and rear portion 202b may be separate recesses that are not joined or may have a separator between the two portions. In some arrangements, the movable, adjustable weight 204 may be rotatably and/or hingedly connected to the club head 200 in order to provide a permanent or constant connection between the adjustable weight 204 and the club head 200 throughout all positions of the adjustable weight 204. The hinge, or a portion of the hinge, may, in some examples, be recessed into the club head, as will be discussed more fully below. For instance, the adjustable weight 204 may rotate around a hinge point, such as pin 224 in FIG. 2B. Pin 224 may, in some examples, extend through at least a portion of the adjustable weight 204 and into a portion of the golf club head.

FIG. 2C illustrates one example arrangement in which the adjustable weight 204 has been rotated to the rear portion 202b of the recess 202. As shown, the forward portion 202a of the recess 200, which housed the adjustable weight 204 in FIG. 2A, is shown as vacant (i.e., the empty cavity of the recess 202 is visible) while the adjustable weight 204 is contained within the rear portion 202b of the recess 202. In some arrangements, the adjustable weight 204 may be held in the desired portion of the recess 202 using a friction fit, snap fit, or other connector 203 such as a lock nut, set screw, hook and loop fastener (e.g., VELCRO), double sided tape or other adhesive, and the like. In some arrangements, mechanical fasteners may be used. These mechanical fasteners may, in some examples, maintain a permanent connection to the club head while being adjustable to permit movement of the adjustable weight 204. That is, although the mechanical fastener may be adjustable or moveable, it may not be removable from the club head and may remain constantly connected to the club head 200. Alternatively, a removable fastener, such as a standard screw, may be used in some arrangements, to secure the weight 204 in position. That is, the connector 203 may be a screw opening configured to receive a screw, etc. to secure the adjustable weight 204 to the golf club head.

In still other examples, the adjustable weight 204 may be held in place using detents and corresponding apertures to receive the detents. For instance, one or more detents, such as detent 220*a*, may be arranged within the recess 202. In some examples, the detents 220*a* may be arranged on the sidewall of the recess, as shown in FIG. 2B. The adjustable weight 204 may include one or more apertures 220*b* to correspond to the one or more detents 220*a*. The detents 220*a* may be received in the apertures 220*b* and may maintain the position of the adjustable weight 204 until the weight 204 is moved to another position. In some examples, a screw, such as screw 222, may be used to further secure the position of the adjustable weight 204 within the recess 202. For instance, a quarter-turn fastener may be used in one example to aid in securing the position of the adjustable weight 204. Alternatively, the detents 220*a* may be formed in the adjustable weight 204 while the apertures 220*b* may be formed in the recess 202.

The adjustable weight 204 may be made of any suitable material, including metals, non-metallic materials, composites, ceramics, polymers, and the like. In some arrangements, the adjustable weight 204 may be formed of carbon steel, stainless steel, carbon fiber, tungsten, tungsten loaded polymer, combinations of one or more of these materials, and the like. In some arrangements, the adjustable weight 204 may be formed of a flexible material to allow some bending or flex in the adjustable weight 204. In other arrangements, the adjustable weight 204 may be formed of stiffer materials. In some examples, the adjustable weight 204 may be formed using molding techniques, such as injection molding. In some examples, the adjustable weight 204 may be formed using a rapid prototyping technique, such as laser sintering, stereolithography, and the like.

The size and/or percentage of total mass of the golf club head associated with the adjustable weight 204 may vary based on the desires of the player, skill level of the player, and the like. In some examples, the adjustable weight 204 may comprise greater than 5% of the total mass of the golf club head. In other examples, the movable and/or adjustable weight 204 may comprise at least 10% of the mass of the golf club head. In still other examples, the mass associated with the movable and/or adjustable weight 204 may comprise at least 15% of the mass of the golf club head.

Distributing weight to various portions of the club head 200 using an adjustable weight 204 that may be rotated from a forward position to a rear position may allow users or club fitters to affect the flight of balls propelled using club heads, such as club head 200 described herein, and golf clubs in accordance with these examples of the invention. For example, it is typically easier for at least some users to get a golf ball airborne using a club head having significant weight located lower and toward its rear (e.g., an adjustable weight 204 in a rear position, such as shown in FIG. 2C). Such weight positioning also may be used to provide a higher, more lofted golf ball flight path, at least for some users. Under some play conditions and/or for some swing types, however, this higher flight bias and/or ball flight path may not be desirable. For example, to produce lower, more boring ball flights, e.g., for play in windy conditions, or for swing flaws that typically produce an excessively high, ballooning ball flight, the adjustable weight 204 may be rotated to the forward position (such as shown in FIG. 2A) to provide increased weight in a forward region of the club head, toward the ball striking face. Accordingly, a user is not committed to maintaining the adjustable weight 204 in just one position and may, instead, adjust or rotate the adjustable weight 204 to distribute the weight of the club as desired for various conditions, a particular shot, etc.

Figure 3A:
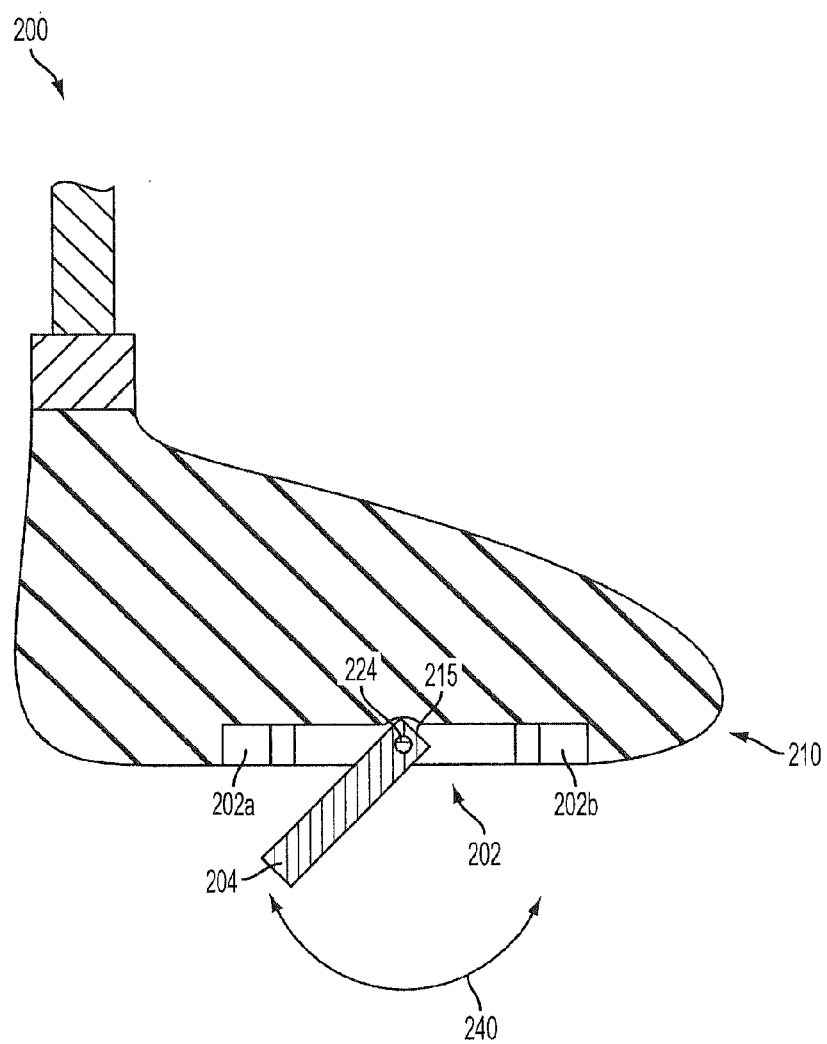
FIGS. 3A-3C are alternate views of the adjustable weight arrangement shown in FIGS. 2A-2C and accordance with illustrative aspects of the invention.
Figure 3B:
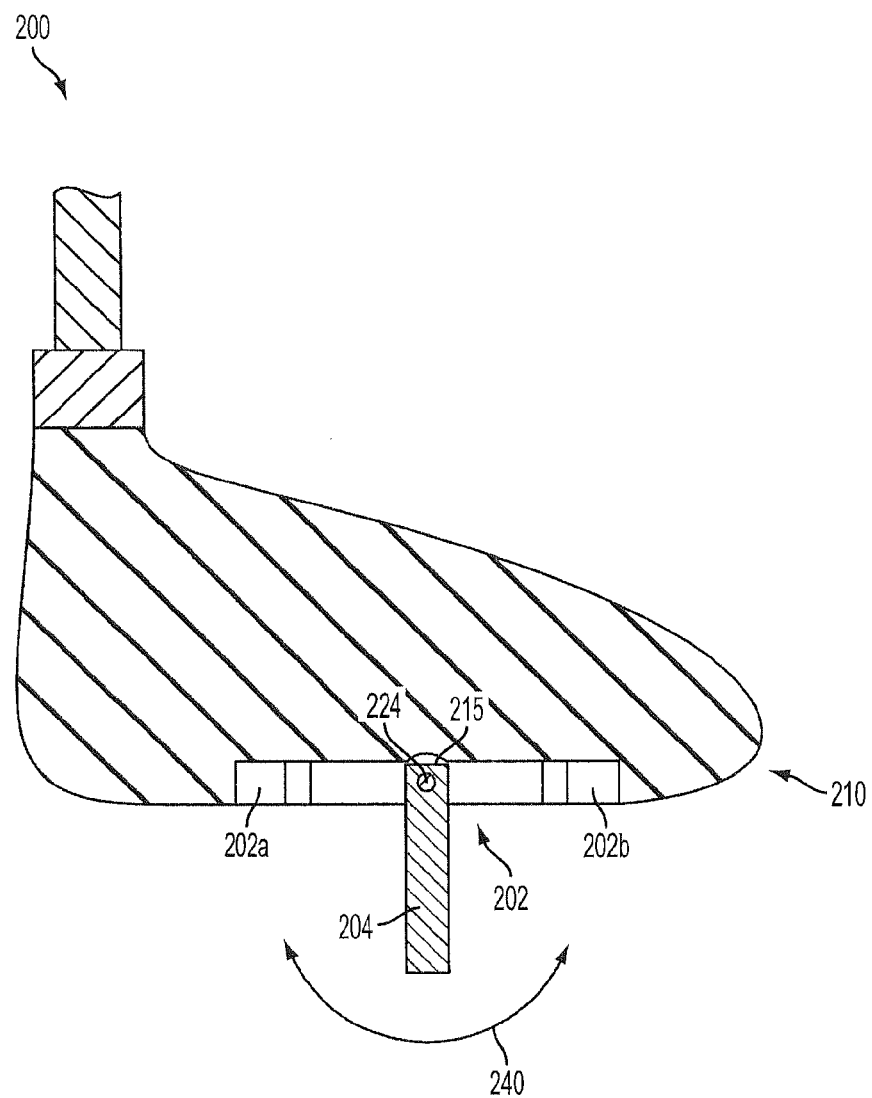
Figure 3C:
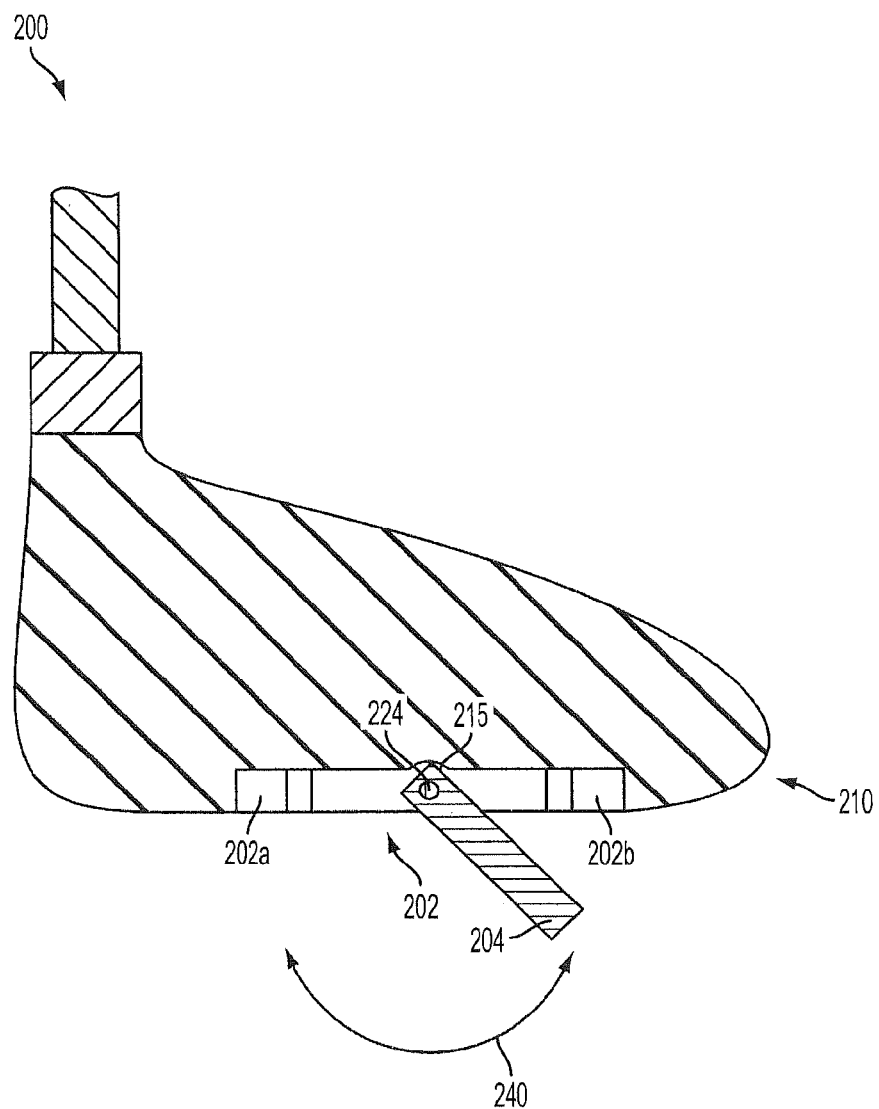

FIGS. 3A-3C illustrate cross sectional views of the movable and/or adjustable weight arrangement shown in FIGS. 2A-2C. The weight 204 is generally arranged in a bottom surface or sole of the club head 200. This distribution of weight in a lower portion of the club head 200 provides a lower center of gravity which may provide improved performance. In the arrangement of FIG. 3A, the adjustable weight 204 has been removed from the front portion 202*a* of the recess 202 and has been at least partially rotated toward the rear 210 of the club head 200 along a path shown by arrow 240. The adjustable weight 204 is generally rotated around a pivot point that may be positioned generally in a central region of the recess 202. The pivot point may include a hinge 215 that aids in rotation of the adjustable weight from a forward position to a rear position. In some examples, the pivot point may include a pin 224 around which the adjustable weight may rotate. As shown in FIG. 3A-3C, the adjustable weight 204 may, in some arrangements, rotate through a plane that is generally perpendicular to a striking face of the club head.

FIG. 3B illustrates the adjustable weight 204 in another intermediate position. The adjustable weight 204 is generally rotated along the path indicated by arrow 240 from a front portion 202*a* of the recess 202 to the rear portion 202*b* of the recess 202. FIG. 3C illustrates the adjustable weight 204 in yet another intermediate position as it is nearly contained within rear portion 202*b* of the recess 202. The adjustable weight 204 may continue to be rotated along a path indicate by arrow 240 until it is contained within the rear portion 202*b* of the recess 202*a*. As discussed above, the adjustable weight 204 may be held in place in the recess 202 by a friction fit, snap fit, etc. As also discussed above, the adjustable weight 204 may be rotated from a first position to a second position without the weight and, in some arrangements, any hardware, etc., being removed from the club head. Instead, the adjustable weight and/or fasteners, hardware, etc. may remain connected to the club head 200 throughout rotation of the adjustable weight 204.

Although the figures generally illustrate an adjustable weight being rotated from a forward position to a rear position, the adjustable weight may also be rotated in a reverse direction, e.g., from a rear position to a front position, and nothing in the specification or figures should be viewed as limiting rotation of the adjustable weight 204 to any particular direction.

FIGS. 4A-4D illustrate another arrangement of an adjustable weight for a golf club head. The golf club head 300 generally includes a recess 302 and movable and/or adjustable weight 304. The adjustable weight 304 may be sized and configured to fit within and/or be contained within the recess 302 in an in-use position. Although one adjustable weight 304 is shown in the Figures, in some arrangements, multiple movable and/or adjustable weights may be used. For instance, a plurality of adjustable weights 304 may be stacked vertically within the recess and one or more may be adjusted to redistribute the weight properties of the club head 300.

Figure 4A:
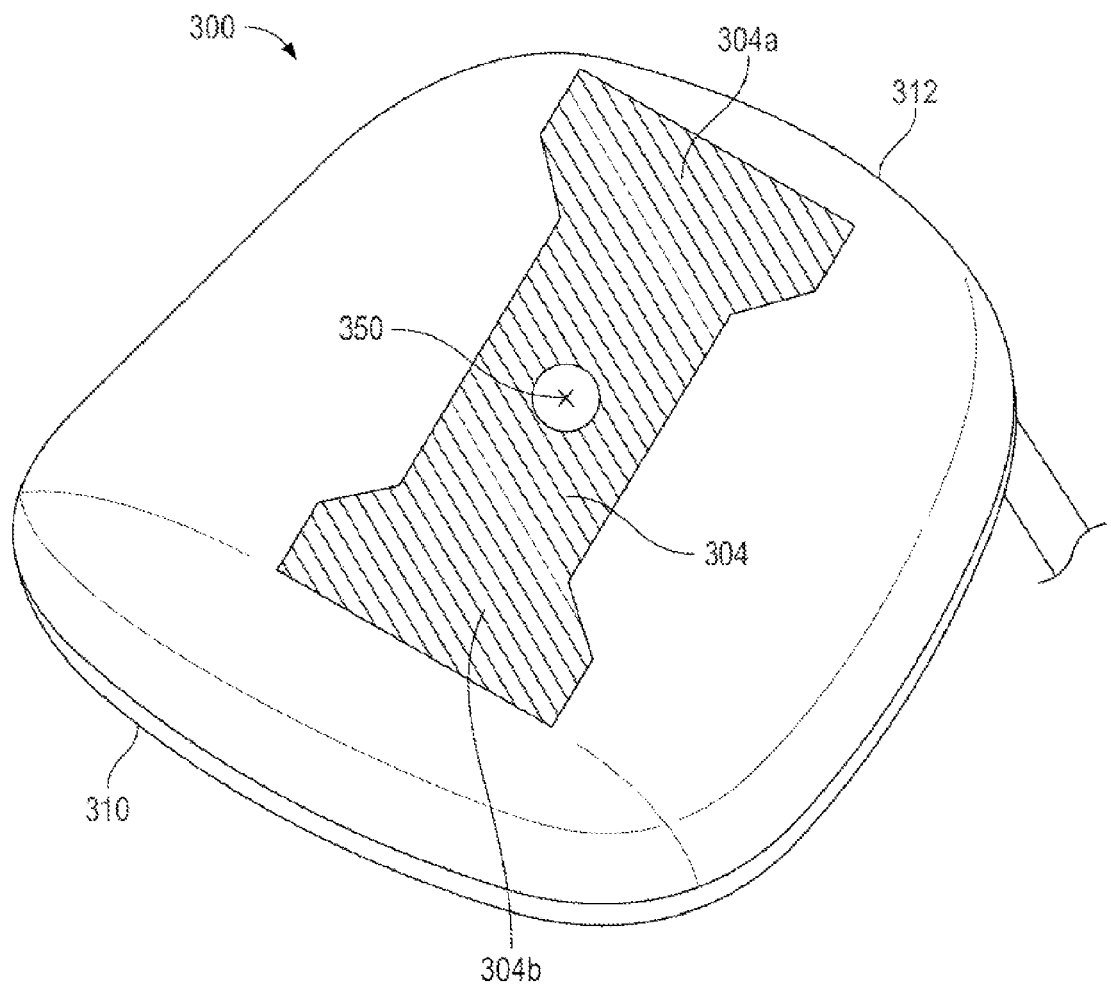
FIGS. 4A-4D illustrate yet another adjustable weight arrangement in accordance with illustrative aspects of the invention.

FIG. 4A illustrates the adjustable weight 304 in a first position. The adjustable weight 304 may include a first end 304a and a second end 304b. The first end 304a may, in some arrangements, be heavier than the second end 304b. That is, the first end 304a may be formed of a heavier or more dense material than the second end 304b. Alternatively, the first end 304a may be lighter than the second end 304b. Thus, the position of the adjustable weight 304 having ends of differing weights may alter the weight characteristics of the club head 300. For instance, if the heavier end of the adjustable weight 304 is positioned toward the rear 310 of the club head 300 (i.e., the lighter end toward the front), the club may provide a higher, more lofted flight path for a ball. Alternatively, if the heavier end of the club head 300 is positioned toward the front of the club head 312 (i.e., the lighter end of the adjustable weight 304 is positioned toward the rear end 310), the club may provide a lower loft for the ball.

The adjustable weight 304 may be made of any suitable material, including metals, non-metallic materials, composites, ceramics, polymers, and the like. In some arrangements, the adjustable weight 304, or portions thereof, may be formed of aluminum, carbon steel, stainless steel, carbon fiber, tungsten, tungsten loaded polymer, and the like. For instance, the adjustable weight 304 may be generally formed of aluminum or aluminum alloy and may include a tungsten loaded weight at one end of the adjustable weight 304 to provide the difference in weight between the first end 304a and the second end 304b.

In some arrangements, the adjustable weight 304 may be formed of a flexible material to allow some bending or flex in the adjustable weight 304. In other arrangements, the adjustable weight 304 may be formed of stiffer materials. In some examples, the adjustable weight 304 may be formed using molding techniques, such as injection molding. For instance, the adjustable weight 304 may be injection molded in a two-shot process to provide one end of the adjustable weight 304 that is heavier than the other end. In some examples, the adjustable weight 304 may be formed using a rapid prototyping technique, such as laser sintering, stereolithography, and the like. In these arrangements, different materials may be used in each end of the adjustable weight 304 to provide a difference in weight between the ends or, in some examples, one end may be formed using additional material than the other end to provide additional weight.

The adjustable weight 304 may be held in place by a fastener 350. The fastener 350 may, in some arrangements, be adjustable. In some examples, both the adjustable weight 304 and the fastener 350 may be connected to the club head 300 such that adjustment of the weight 304 or the fastener 350 does not result in removal of the weight 304 or fastener 350 from the club head 300. That is, the adjustable weight 304 and fastener 350, as well as any additional fasteners or hardware (not shown) may be constantly connected to the club head 300 regardless of the position of the adjustable weight 304.

In order to adjust the weight, the adjustable weight 304 may be rotated, for instance, around the fastener 350. In some arrangements, the fastener may be biased or spring loaded to draw the adjustable weight 304 downward, toward the recess 302 formed in the club head 300. Adjustment of the weight 304 may include pulling or lifting the adjustable weight 304 upward, out of the recess 302 (against the bias of the spring loaded fastener 350) and rotating the adjustable weight 304 about the fastener 350. The fastener 350 may extend to permit this upward movement and rotation of the adjustable weight 304 and may pull the adjustable weight 304 downward, due to the bias of the fastener 350, when the adjustable weight 304 is aligned with the recess 302. For instance, fastener 350 may include a pull-down friction fastener to aid in adjusting and/or maintaining position of the weight 304.

Figure 4B:
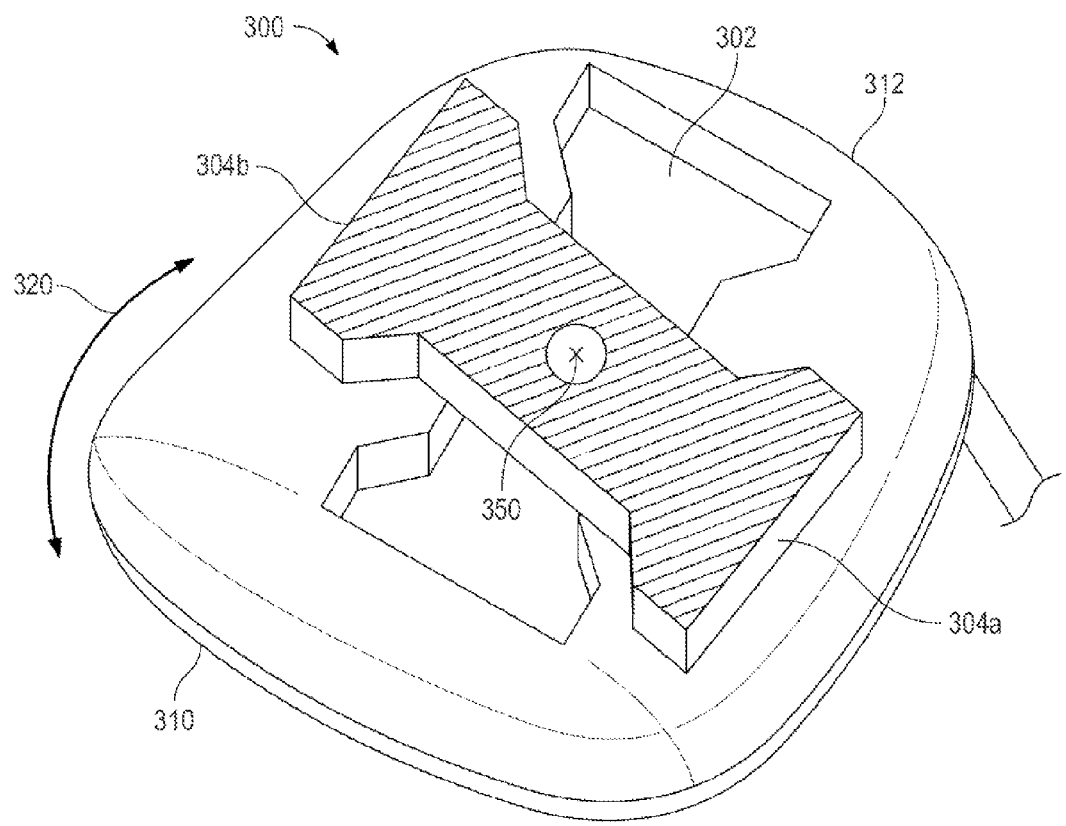

For example, FIG. 4A illustrates the adjustable weight 304 in a first position. In order to adjust the weight, the adjustable weight 304 may be pulled upward, out of the recess 302, as shown in FIG. 4B. In some examples, the adjustable weight 304 may be spring loaded to maintain the position of the adjustable weight 304 within the recess 302. The adjustable weight 304 may be rotated, for instance, along a path indicated by arrow 320. As shown in FIGS. 4A-4D, in some arrangements, the adjustable weight 304 may be rotated in plane generally perpendicular to a striking face of the club head 300.

Figure 4C:
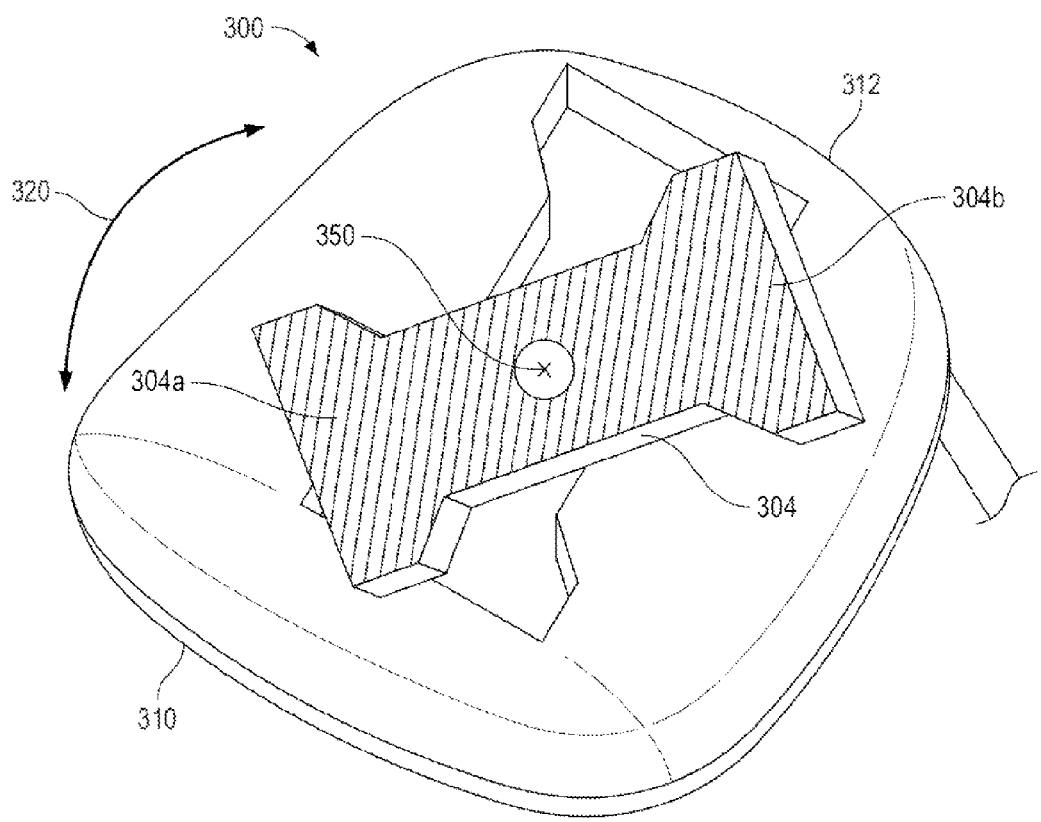
Figure 4D:
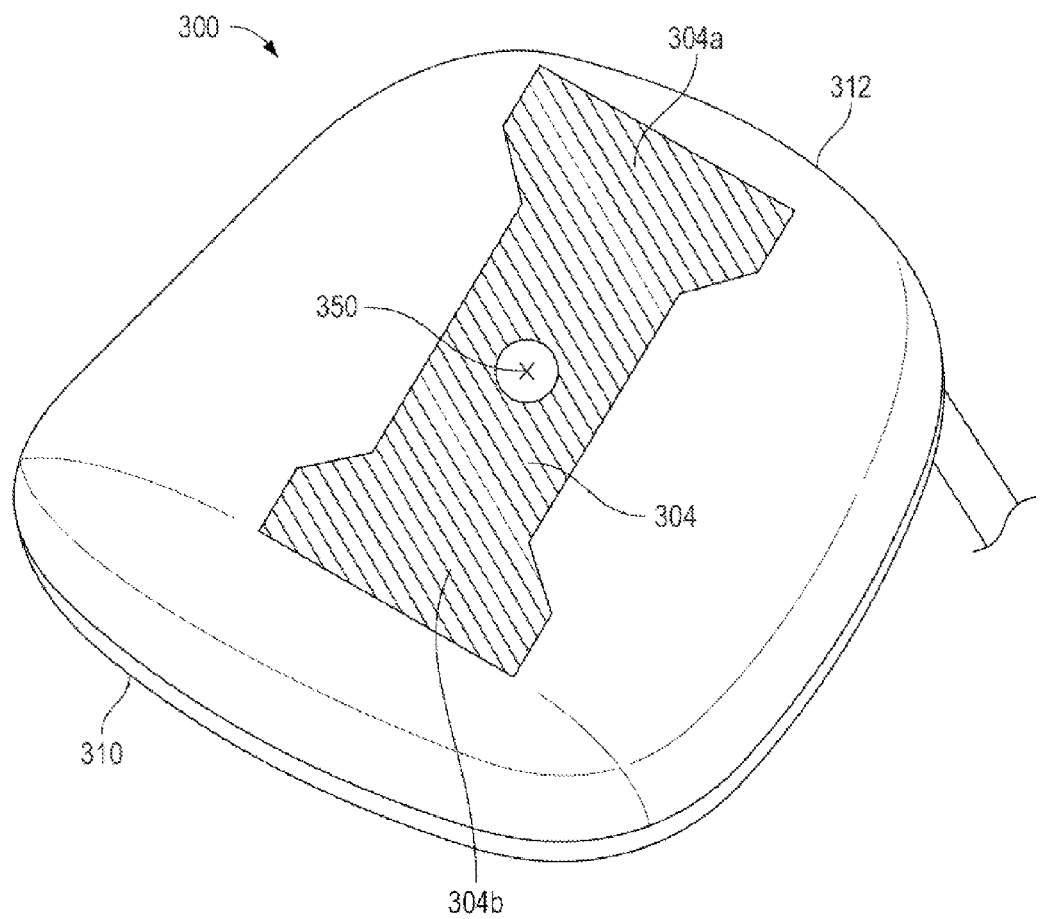

FIG. 4C illustrates the movable and/or adjustable weight 304 in another intermediate position as the adjustable weight 304 is rotated from a first position to a second position. End 304a is shown proximal the rear end 310 of the club head 300, while end 304b is shown positioned proximal the front 312 of the club head 300. FIG. 4D illustrates the adjustable weight 304 in the second position. As shown, the adjustable weight 304 is contained within the recess 302 and may be held in place by fastener 350, such as biased or spring loaded fastener described above. End 304a is positioned near the rear end 310 of the club head 300 while end 304b is position proximal the front end 312 of the club head 300. These positions are generally the opposite of the position shown in FIG. 4A in which end 304b was positioned proximal the rear 310 of the club head 300 while end 304a was positioned proximal the front end 312 of the club head 300. The difference in weight associated with ends 304a and 304b may provide adjustability to a user in order to vary loft characteristics associated with a ball struck by the club. As discussed above, movement or adjustment of adjustable weight 304 through the positions shown in the figures, and various other positions throughout rotation, may be performed with the adjustable weight 304 and any fasteners, such as fastener 350, being constantly connected to the club head 300. This arrangement may reduce the risk associated with loose or loosely connected portions of the weight system being thrown from the club head 300 during use.

Figure 6A:
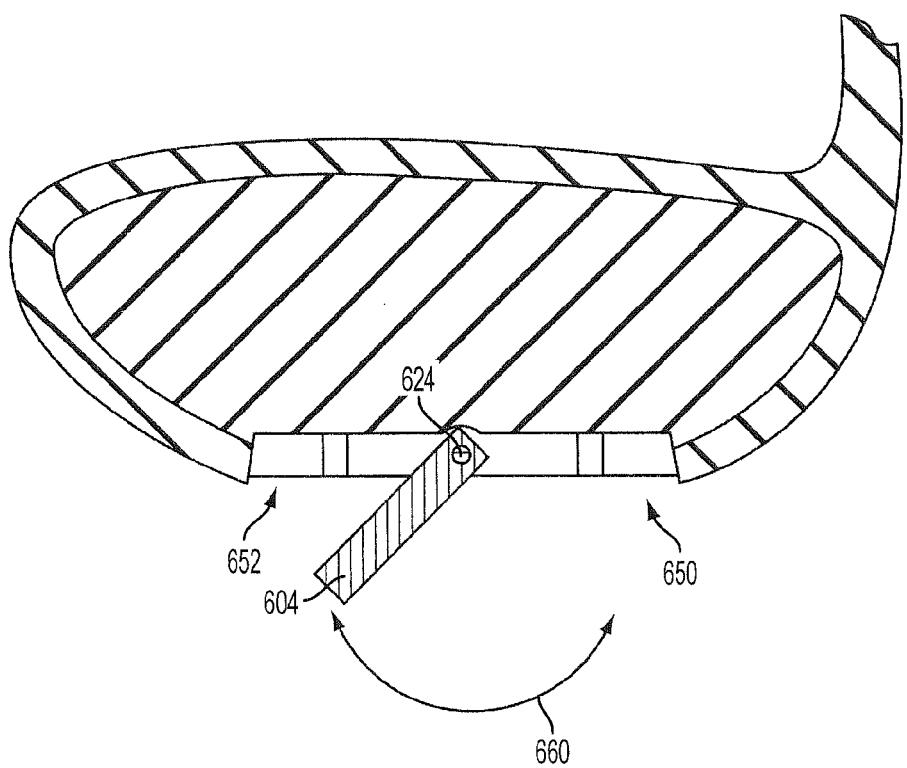
FIGS. 6A-6C illustrate yet another example moveable and/or adjustable weight arrangement in accordance with at least some illustrative aspects of the invention.
Figure 6B:
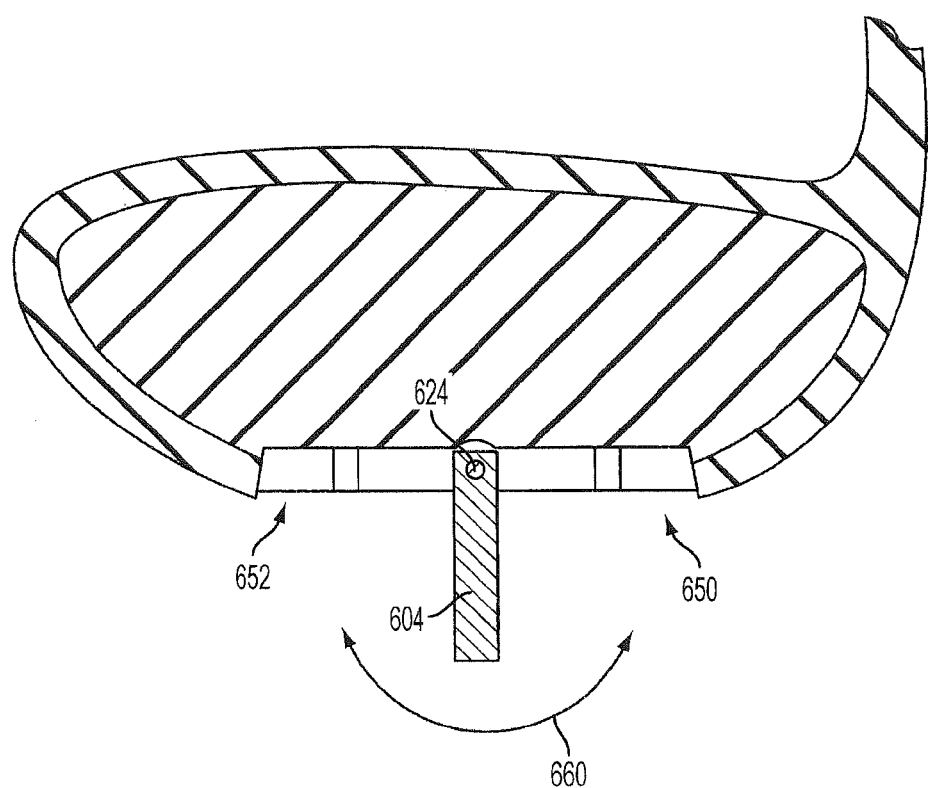
Figure 6C:
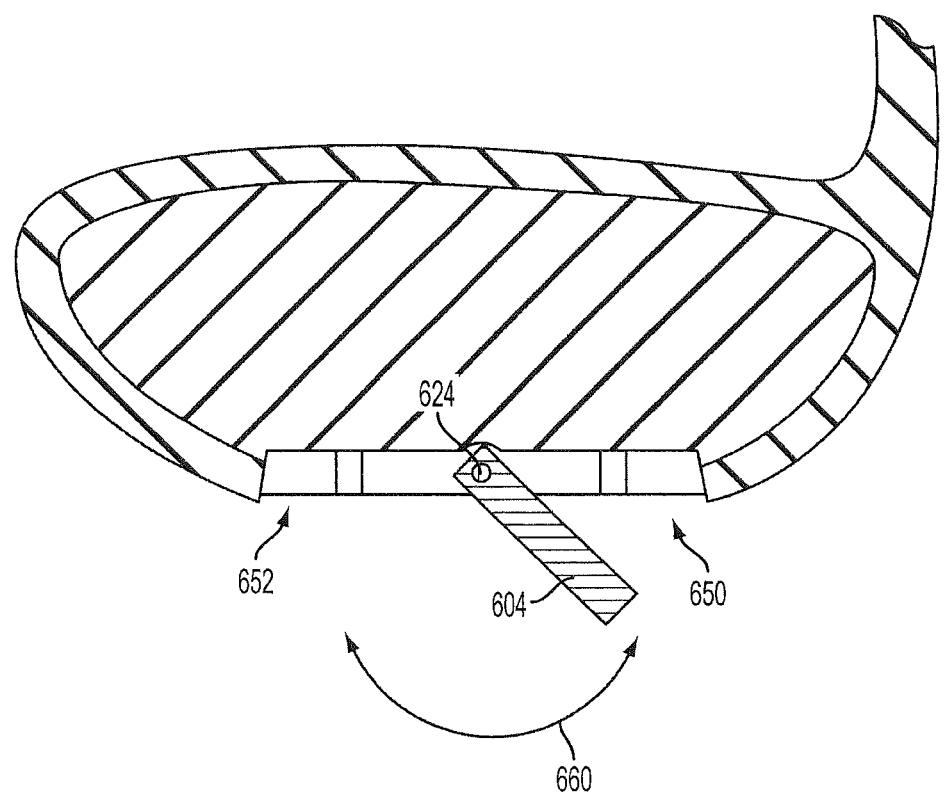

FIGS. 6A-6C illustrate one example movable and/or adjustable weight arrangement similar to the arrangement of FIGS. 2A-3C, however, the movable and/or adjustable weight 604 may rotate from a heel end of the recess 650 of the golf club head to a toe end of the recess 652, and vice versa. For instance, FIG. 6A illustrates the movable and/or adjustable weight 604 slightly removed from a toe end of the recess 652 of the golf club head. The moveable and/or adjustable weight may be rotated in a direction indicate by line 660. FIG. 6B illustrates the adjustable weight 604 further rotated toward the heel end of the recess 650 from the position shown in FIG. 6A. FIG. 6C illustrates the adjustable weight 604 nearing the heel end recess 650. Similar to the arrangements of FIGS. 3A-3C, the rotation of the adjustable weight 604 from the toe end recess to the heel end recess (or the heel end recess to the toe end recess, as desired) may permit the weight associated with the club to be redistributed or adjusted to suit the desired performance characteristics of the golfer. Additionally or alternatively, the movable/adjustable weight member 604 may include a plurality of weight members, similar to the arrangement of FIGS. 5A-5C. Also similar to the arrangement of FIGS. 6A-6C, the adjustable weight 604 may rotate about a pin, such as pin 624, or hinge. Although a pin arrangement is shown in the figures, other types of rotational arrangements may be used without departing from the invention.

In still other examples, slidable weights may be used to provide adjustment of the weight distribution associated with the golf club head. For instance, one or more weight members may be slidable along a surface of the golf club head, for example within a recess, to shift a portion of the weight from one position to another, as desired.

Weight adjustable golf club heads of the types described above may be used by golfers, on the golf course, for their regular play (users can maintain the ability to modify the weight settings and/or customize the club head to their swing characteristics). As another example, however, golf club heads in accordance with at least some examples of this invention (e.g., of the types described above) also may be useful for club fitting purposes. For example, by providing club heads with adjustable weight members of the types described above, club fitters and/or users can quickly adjust the playing characteristics of a club head by adjusting or repositioning the adjustable weight used with the club head. In this manner, a user being fit for new clubs and/or club components can quickly try different weighting characteristics for the club head using a single club head in order to determine a weight arrangement suited to the user.

CONCLUSION

While the invention has been described in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. A golf club head, comprising:
    a club head body, the club head body including at least a front, a rear, a heel, a toe, a sole portion, a top and a ball striking surface, the club head body defining an interior cavity of the golf club head;
    a recess formed in the sole of the golf club head wherein the recess recedes only at a bottom surface of the sole; and
    an adjustable weight, the adjustable weight being received in the recess formed in the sole of the golf club and being movably connected to the golf club head by a hinge around which the adjustable weight is rotated, the adjustable weight being movable from a first position proximal the front of the club head body to a second position proximal the rear of the club head body.

2. The golf club head of claim 1, wherein the movable connection is a rotatable connection.

3. The golf club head of claim 1, wherein the adjustable weight is received in a portion of the recess in an in-use position.

4. The golf club head of claim 3, wherein another portion of the recess is vacant.

5. The golf club head of claim 1, wherein the adjustable weight is connected to the club head body in the first position, the second position and any intermediate positions.

6. A golf club head, comprising:
    a club head body having a recess formed in a sole of the club head body wherein the recess recedes only at a bottom surface of the sole, the club head body having a first end and a second end; and
    an adjustable weight shaped to be received in at least a portion of the recess formed in the club head body, the adjustable weight being rotatable by a hinge around which the adjustable weight is rotated from a first position proximal the first end of the club head body to a second position proximal the second end of the club head body.

7. The golf club head of claim 6, wherein the first position includes the adjustable weight contained within a first portion of the recess and a second portion of the recess being vacant.

8. The golf club head of claim 7, wherein the second position includes the adjustable weight contained within a second portion of the recess and a first portion of the recess being vacant.

9. The golf club head of claim 6, wherein the first end of the club head body is a front end of the golf club head and the second end of the club head body is a rear end of the golf club head.

10. The golf club head of claim 6, wherein the adjustable weight is rotatable in a plane generally perpendicular to a striking face of the golf club head.

11. The golf club head of claim 6, wherein the adjustable weight is connected to the club head body in the first position, the second position and any intermediate positions.

* * * * *